(12) United States Patent
Jägenstedt et al.

(10) Patent No.: US 10,178,826 B2
(45) Date of Patent: *Jan. 15, 2019

(54) MODULAR ROBOTIC VEHICLE

(71) Applicant: HUSQVARNA AB, Huskvarna (SE)

(72) Inventors: Patrik Jägenstedt, Tenhult (SE);
Magnus Öhrlund, Malmbäck (SE);
Mats Svensson, Huskvarna (SE)

(73) Assignee: HUSQVARNA AB, Huskvarna (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/293,993

(22) Filed: Oct. 14, 2016

(65) Prior Publication Data

US 2017/0079201 A1 Mar. 23, 2017

Related U.S. Application Data

(63) Continuation of application No. 14/412,499, filed as application No. PCT/SE2013/050800 on Jun. 27, 2013, now Pat. No. 9,491,904.

(Continued)

(51) Int. Cl.
*A01D 34/00* (2006.01)
*A01D 42/06* (2006.01)
(Continued)

(52) U.S. Cl.
CPC ............ *A01D 34/008* (2013.01); *A01D 42/00* (2013.01); *A01D 42/06* (2013.01); *A01D 42/08* (2013.01);
(Continued)

(58) Field of Classification Search
CPC ...... A01D 34/008; A01D 42/08; A01D 42/06; A01D 42/00; B60L 11/1805; B60L 15/20;
(Continued)

(56) References Cited

U.S. PATENT DOCUMENTS 3,882,615 A * 5/1975 Williams .............. A01D 42/08
37/243
RE29,139 E 2/1977 Messner
(Continued)

FOREIGN PATENT DOCUMENTS

DE 102009027557 A1 1/2011
WO 9749528 A1 12/1997
(Continued)

OTHER PUBLICATIONS

International Search Report and Written Opinion in the International patent application No. PCT/SE2013/050800 dated Oct. 9, 2013, all enclosed pages cited.

(Continued)

*Primary Examiner* — Rodney Butler
(74) *Attorney, Agent, or Firm* — McNair Law Firm, P.A.

(57) ABSTRACT

A robotic vehicle may include a power module and a working module. The power module may include control circuitry configured to execute stored instructions to direct operation of the robotic vehicle on a defined area, and a drive motor for propelling the robotic vehicle responsive to control by the control circuitry. The working module may be configured to perform a function with respect to the defined area responsive to being propelled by the power module. The working module may be one of a plurality of interchangeable working modules that are attachable to the power module. At least one of the interchangeable working modules may have a different function than the working module.

20 Claims, 6 Drawing Sheets

Related U.S. Application Data (60) Provisional application No. 61/668,156, filed on Jul. 5, 2012.

(51) Int. Cl.

| | | |
|---|---|---|
| *A01D 42/08* | (2006.01) | |
| *G05D 1/02* | (2006.01) | |
| *B60L 3/00* | (2006.01) | |
| *B60L 8/00* | (2006.01) | |
| *B60L 11/18* | (2006.01) | |
| *B60L 15/20* | (2006.01) | |
| *A01D 42/00* | (2006.01) | |
| *B60L 1/00* | (2006.01) | |

(52) U.S. Cl.
CPC .............. *B60L 1/003* (2013.01); *B60L 3/0061* (2013.01); *B60L 8/003* (2013.01); *B60L 11/1805* (2013.01); *B60L 11/1818* (2013.01); *B60L 11/1877* (2013.01); *B60L 15/20* (2013.01); *G05D 1/0238* (2013.01); *G05D 1/0265* (2013.01); *B60L 2200/40* (2013.01); *B60L 2240/36* (2013.01); *B60L 2240/421* (2013.01); *B60L 2260/32* (2013.01); *G05D 2201/0208* (2013.01); *Y02P 90/60* (2015.11); *Y02T 10/645* (2013.01); *Y02T 10/705* (2013.01); *Y02T 10/7005* (2013.01); *Y02T 10/7072* (2013.01); *Y02T 10/7083* (2013.01); *Y02T 10/72* (2013.01); *Y02T 10/7275* (2013.01); *Y02T 90/14* (2013.01); *Y10S 901/01* (2013.01); *Y10S 901/46* (2013.01)

(58) Field of Classification Search
CPC ........ B60L 1/003; B60L 8/003; B60L 3/0061; B60L 11/1877; B60L 11/1818; B60L 2260/32; B60L 2240/36; B60L 2200/40; B60L 2240/421; G05D 1/0265; G05D 1/0238; G05D 2201/0208; Y10S 901/01; Y10S 901/46; Y02P 90/60; Y02T 10/7005; Y02T 10/7072; Y02T 10/705; Y02T 10/7275; Y02T 10/72; Y02T 90/14; Y02T 10/645; Y02T 10/7083
See application file for complete search history.

(56) References Cited

U.S. PATENT DOCUMENTS

| | | | |
|---|---|---|---|
| 4,321,785 A | 3/1982 | Kaland | |
| 5,204,814 A | 4/1993 | Noonan et al. | |
| 5,992,134 A | 11/1999 | Blide et al. | |
| 6,321,515 B1 | 11/2001 | Colens | |
| 6,338,013 B1 | 1/2002 | Ruffner | |
| 8,136,333 B1 * | 3/2012 | Levin .................. | A01D 34/685 30/276 |
| 2002/0156556 A1 | 10/2002 | Ruffner | |
| 2003/0029149 A1 | 2/2003 | Fillman et al. | |
| 2004/0112028 A1 | 6/2004 | Duncan et al. | |
| 2005/0244260 A1 | 11/2005 | Deplano | |
| 2008/0209665 A1 * | 9/2008 | Mangiardi ............ | A47L 11/302 15/319 |
| 2009/0281661 A1 * | 11/2009 | Dooley .................. | B60L 3/106 700/258 |
| 2011/0043515 A1 * | 2/2011 | Stathis ................ | G01C 15/002 345/419 |

FOREIGN PATENT DOCUMENTS

| | | |
|---|---|---|
| WO | 0060921 A1 | 10/2000 |
| WO | 2007028049 A2 | 3/2007 |
| WO | 2013068716 A1 | 5/2013 |

OTHER PUBLICATIONS

International Preliminary Report on Patentability in the International patent application No. PCT/SE2013/050800 dated Jan. 6, 2015, all enclosed pages cited.

* cited by examiner

MODULAR ROBOTIC VEHICLE

CROSS-REFERENCE TO RELATED APPLICATIONS

This application is a continuation of U.S. application Ser. No. 14/412,499 filed Jan. 2, 2015; which is a national phase entry of PCT/SE2013/050800 filed Jun. 27, 2013, which claims priority to U.S. application Ser. No. 61/668,156 filed Jul. 5, 2012, the entire contents of which are hereby incorporated by reference.

TECHNICAL FIELD

Example embodiments generally relate to robotic vehicles and, more particularly, relate to a robotic vehicle that has a modular construction.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. More recently, robotic mowers and/or remote controlled mowers have also become options for consumers to consider.

Lawn mowers are typically capable of transiting over even and uneven terrain to execute yard maintenance activities relating to mowing. However, most lawn mowers are repeatedly exposed to the same operating environments over the course of their lifetimes. For example, a lawn mower may operate to cut a single yard over its entire life, or may operate to cut a relatively fixed series of yards or parcels if it is used for commercial purposes. Given that computing devices are becoming more ubiquitous, it is to be expected that they may be employed to assist in operation of lawn mowers. As such, many additional functionalities may be provided or supported by the employment of computing devices on lawn mowers.

A robotic mower is one example of a device that employ an onboard computing device to enable its function. Moreover, such a mower is capable of autonomous or self-guided operation under the control of such a computing device. To control its operation, a robotic mower may employ a plurality of sensors to detect various boundaries and/or objects or to detect events such as a collision with an object, or detect when the mower has been lifted or tipped over. Detecting these events may be useful in controlling the application of drive and/or cutting power, or providing other control functions.

A typical robotic mower fits all of its electronics and hardware onto a single chassis. Accordingly, such a mower is relatively limited with respect to its ability to be adapted to other uses, or to be adapted with respect to its form relative to its intended use.

BRIEF SUMMARY OF SOME EXAMPLES

Some example embodiments may therefore provide a robotic device having a modular construction. By employing a modular construction, the device may be very adaptable by simply switching out various modules that are usable in connection with the device. Such a modular construction may also enable other benefits to be realized such as improvements related to control of cutting height on mower embodiments, improvement with respect to care and cleaning, improvements with respect to maintaining ground coverage over difficult terrain, and/or the like.

In an example embodiment, a robotic vehicle is provided. The robotic vehicle may include a power module and a working module. The power module may include control circuitry configured to execute stored instructions to direct operation of the robotic vehicle on a defined area, and a drive motor for propelling the robotic vehicle responsive to control by the control circuitry. The working module may be configured to perform a function with respect to the defined area responsive to being propelled by the power module. The working module may be one of a plurality of interchangeable working modules that are attachable to the power module. At least one of the interchangeable working modules may have a different function than the working module.

In another example embodiment, a robotic vehicle is provided that may include a power module and a working module. The power module may include control circuitry configured to execute stored instructions to direct operation of the robotic vehicle on a defined area, and a drive motor for propelling the robotic vehicle responsive to control by the control circuitry. The working module may have a frame and be configured to perform a function with respect to the defined area responsive to being propelled by the power module. The power module may include a universal frame support extending from a front portion of the power module to rotatably engage a portion of the frame of the working module.

In yet another example embodiment, a robotic vehicle is provided that may include a power module and a cutting deck. The power module may include control circuitry configured to execute stored instructions to direct operation of the robotic vehicle on a defined area, and a drive motor for propelling the robotic vehicle responsive to control by the control circuitry. The cutting deck may include a frame that is operably coupled to a cutter support beam supporting a plurality of cutting discs configured to perform a cutting function with respect to the defined area responsive to being propelled by the power module. The cutting deck may be releasably and pivotally attached to a forward portion of the power module.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Robotic vehicles such as robotic mowers, robotic watering devices, robotic brush cutters, robotic snow movers, and/or the like, typically operate in an area that is defined by some technical implementation by which to define boundaries such as, for example, a guide wire that bounds the area to be worked. The robotic vehicle then roams within the bounded area to ensure that the entire area is mowed, watered, or otherwise worked, but the robotic vehicle does not go outside of the bounded area.

Figure 1:
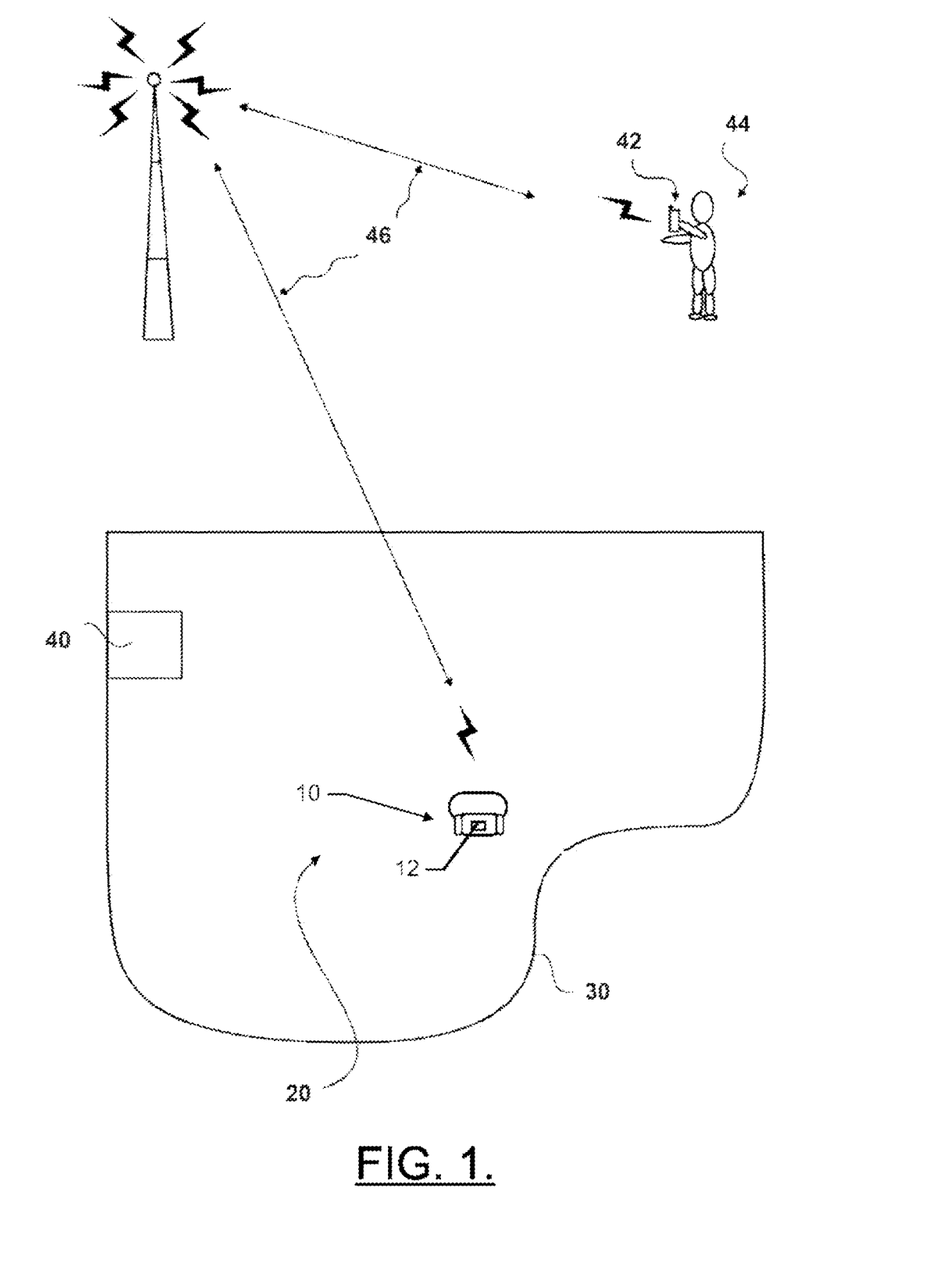
FIG. 1 illustrates an example operating environment for a robotic mower.

FIG. 1 illustrates an example operating environment for a robotic vehicle 10 that may employ a system bounded by such a guide wire. Although the robotic vehicle 10 is perhaps most commonly seen embodied as a robotic mower, it should be appreciated that a robotic mower is merely an example of a robotic vehicle that may employ an example embodiment. The robotic vehicle 10 may operate to work on a parcel 20 (i.e., a land lot), the boundaries of which may be defined using one or more physical boundaries (e.g., a fence, wall, curb and/or the like), a guide wire 30 or combinations thereof. The guide wire 30 may emit electrical signals that are detectable by the robotic vehicle 10 to inform the robotic vehicle 10 when a boundary of the parcel 20 has been reached. The robotic vehicle 10 may be controlled, at least in part, via control circuitry 12 located onboard. The control circuitry 12 may include, among other things, the ability to detect the guide wire 30 to redirect the robotic vehicle 10 to other areas within the parcel 20.

In an example embodiment, the robotic vehicle 10 may be battery powered via one or more rechargeable batteries. Accordingly, the robotic vehicle 10 may be configured to return to a charge station 40 that may be located at some position on the parcel 20 in order to recharge the batteries. The batteries may power a drive system and a blade control system of the robotic vehicle 10. However, the control circuitry 12 of the robotic vehicle 10 may selectively control the application of power or other control signals to the drive system and/or the blade control system to direct the operation of the drive system and/or blade control system. Accordingly, movement of the robotic vehicle 10 over the parcel 20 may be controlled by the control circuitry in a manner that enables the robotic vehicle 10 to systematically traverse the parcel 20 while operating a cutting blade to cut the grass on the work area of the parcel 20.

In some embodiments, the control circuitry 12 of the robotic vehicle 10 may be configured to communicate with an electronic device 42 (e.g., a computer, mobile telephone, PDA, smart phone, and/or the like) of a remote operator 44 via a wireless communication network 46. However, the wireless network 46 and other remote devices may not be employed in some embodiments, as described below. If employed, the wireless network 46 may be a data network, such as a local area network (LAN), a metropolitan area network (MAN), a wide area network (WAN) (e.g., the Internet), and/or the like, which may couple the robotic vehicle 10 to devices such as processing elements (e.g., personal computers, server computers or the like) or databases. In some cases, the wireless network 46 may be a peer-to-peer (P2P) network or a proprietary network. Communication between the wireless network 46 and the devices or databases (e.g., servers, electronic device 42, control circuitry 12) may be accomplished by either wireline or wireless communication mechanisms and corresponding protocols.

Figure 2A:
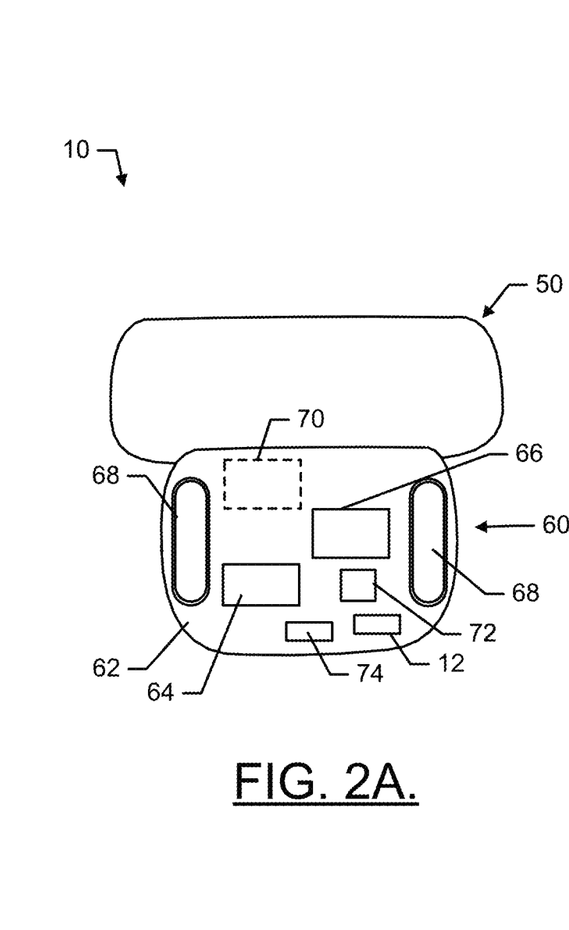
FIG. 2A illustrates a schematic view of a lower chassis and various components of the robotic mower according to an example embodiment.
Figure 2B:
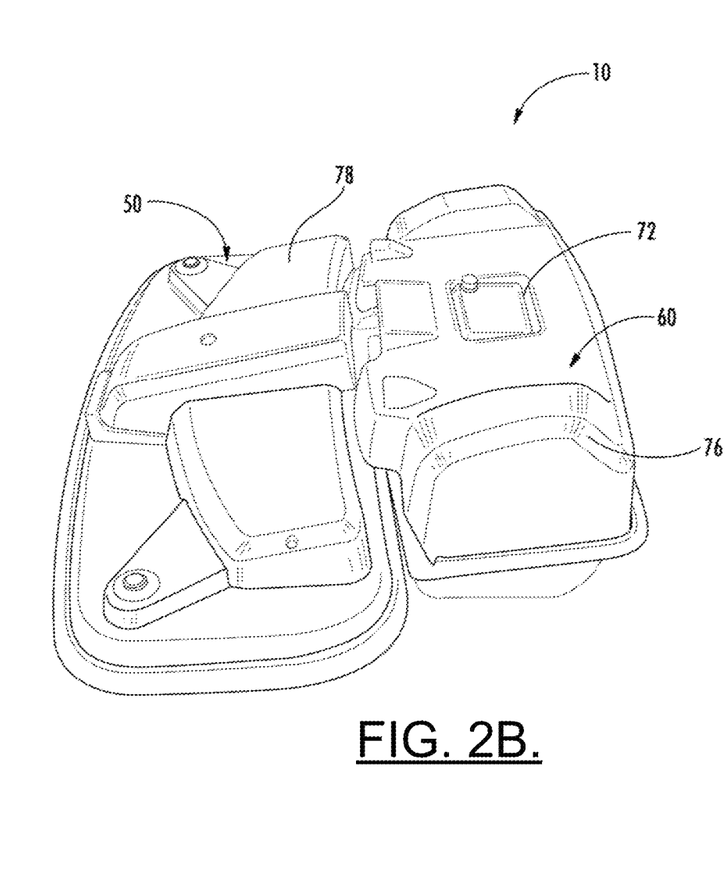
FIG. 2B illustrates a schematic view of an upper chassis and various other components of the robotic mower according to an example embodiment.

FIG. 2, which includes FIGS. 2A and 2B, illustrates some of the general parts that may be employed in connection with an example of the robotic vehicle 10. However, it should be appreciated that example embodiments may be employed on numerous other vehicles that may employ different designs. FIG. 2A illustrates a schematic view of a lower chassis and various components of the robotic mower according to an example embodiment and FIG. 2B illustrates a perspective view of the robotic mower according to an example embodiment. It should be appreciated that the robotic vehicle 10 may take different forms or shapes, and may include different components in some embodiments. Moreover, it should be appreciated that the arrangement of components shown in FIG. 2A could be changed in alternative embodiments, and the components are not drawn to scale.

Referring to FIGS. 1 and 2, the robotic vehicle 10 may include a working module 50 and a power module 60 (or carrier unit). The working module 50 may be any of a number of working attachments that may be affixed to the power module 60 to perform a particular function. For example, in some cases, the working module 50 may include a cutting deck, a snow throwing attachment, a brush cutting attachment, a sweeping attachment and/or the like. In an example embodiment, the working module 50 may be fixed to the power module 60 at the factory or otherwise before shipment to or purchase by the user. However, in other cases, the working module 50 may be attached by the user. Moreover, in some cases, the working module 50 may be relatively easy to remove and replace with other interchangeable working modules. For example, an entirely different function may be enabled by providing a different working module 50. Alternatively or additionally, the size of the working module may be increased or decreased and/or different modules with corresponding accessories may be provided for attachment at the user's option.

The power module 60 may include a lower chassis 62 or other chassis component which may form a frame or base structure upon which other components may be provided. In an example embodiment, the lower chassis 62 may support one or more batteries in a battery pack 64. The lower chassis 62 may also support a drive motor 66 that may be configured to turn wheels 68 based on control signals provided by the control circuitry 12 using power from the battery pack 64. As such, the lower chassis 62 may also form a support structure from which the wheels 68 may be supported. In some embodiments, the wheels 68 may be configured to operate either in a forward or backward direction, but may otherwise not be steerable. However, in some alternative embodiments, the wheels 68 may also be enabled to contribute to steering, or an additional set of wheels for providing steering inputs may be provided.

In some embodiments, the battery pack 64 may also power a work motor 70 that may be supported on the power module 60. However, in other examples, the battery pack 64 may power one or more individual work motors that may be disposed at the working module 50 to power components thereof. In an example embodiment, the power module 60 may also include a user interface 72 and one or more sensors 74 that may form part of a sensor network, or may stand alone to sense any of various parameters associated with the robotic vehicle 10. The user interface 72 may be employed to interface with the control circuitry 12 for controlling operations of the robotic vehicle 10.

In an example embodiment, each of the power module 60 and the working module 50 may include a housing or cover (see covers 76 and 78, respectively) to provide an aesthetically pleasing exterior, contain or repel materials, and/or protect components from impact or natural elements. In one example embodiment, the user interface 72 may be disposed on the cover 76 of the power module 60.

In an example embodiment, the one or more sensors 74 may be used to detect the guide wire 20 and/or objects that may form part of the boundary of the parcel. The sensors 74 may also detect objects that may be encountered during operation of the robotic vehicle 10 within the boundaries of the parcel 20. These objects may be fixed or temporary (e.g., movable) objects. In some cases, the sensors 74 may include a front sensor and a rear sensor. However, it should be appreciated that any number of sensors may be employed and they may be disposed at any desirable location on the robotic vehicle 10. The sensors 74 may, in some cases, include sensors related to positional determination (e.g., a GPS receiver, an accelerometer, a camera, a radar transmitter/detector, an ultrasonic sensor, a laser scanner and/or the like). Thus, for example, positional determinations may be made using GPS, inertial navigation, optical flow, radio navigation, visual location (e.g., VSLAM) and/or other positioning techniques or combinations thereof. Accordingly, the sensors 74 may be used, at least in part, for determining the location of the robotic vehicle 10 relative to boundaries or other points of interest (e.g., a starting point, the guide wire or other key features) of the parcel 20, or determining a position history or track of the robotic vehicle 10 over time. In other examples, the sensors 74 may additionally or alternatively detect collisions, lifting, tipping or other events related to operation of the robotic vehicle 10.

In some embodiments, the sensors 74 of the sensor network of the robotic vehicle 10, and all other electrical components of the robotic vehicle 10 may be in communication with the control circuitry 12 via a single communication bus. Thus, for example, bus-based decentralized communication may be provided in order to enable scaling of cutting motors, sensors and/or the like. In an example embodiment, the control circuitry 12 may be housed in an electronics box of a standard size so that additional scaling may be supported to add or remove circuit boards, chips or modules as desired. The battery pack 64 may also be housed in a standard sized or modular battery compartment to allow scaling of the size of the battery pack 64 as appropriate for the equipment being powered thereby. The drive motor 66, work motor 70, mainboard, sensors and other components of the power module 60 may therefore also be modular and/or replaceable to enable the user to exchange, replace, add or otherwise provide functional units for the robotic vehicle 10 to expand or contract its capabilities as desired. In some cases, the modular nature of the power module 60 may support the addition of modules required or desired for operation with particular work modules 50 that may be selected for operation with the robotic vehicle 10. However, in other examples, a single configuration of the power module 60 may support a number of different work modules 50.

Accordingly, in an example embodiment, an autonomous or self-guided robotic vehicle may be provided that includes a power module and a working module. The working module may be any one of a number of interchangeable different functional attachments that can be attached to a single power module. The different functional attachments may each have different purposes, or they may have the same purpose, but different mechanisms for carrying out such purpose. Meanwhile, in some cases, the power module may be interchangeably arranged with any of the working module embodiments with minimal or no use of tools for making configuration changes. However, in some embodiments, the power module may need some minor configuration changes to support certain working modules. Meanwhile, modular modifications to the power, control circuitry, sensors, or other accessories of the power module may also be possible when desired.

The separation of the power module 60 and the working module 50 may be useful for enabling the type of interchangeability described above. However, such separation may also have other benefits. For example, grass waste and other debris that a working module 50 may generate can be very aggressive relative to deteriorating or corroding plastic, rubber and even metals. Thus, units that combine components of a working module and power module into a single body may require relatively complex and expensive design features (e.g., seals, bellows, gaskets, etc.) to attempt to keep critical parts separated from debris. By dividing the power module 60 from the working module 50 (i.e., making them completely separable from each other) according to an example embodiment, it may be possible to more economically and effectively separate sensitive parts from debris that could harm them. It may also be possible to undertake more aggressive cleaning of working module 50 parts without worrying about risk to the more sensitive parts (e.g., electronics and other sensitive parts) of the power module 60.

Figure 3:
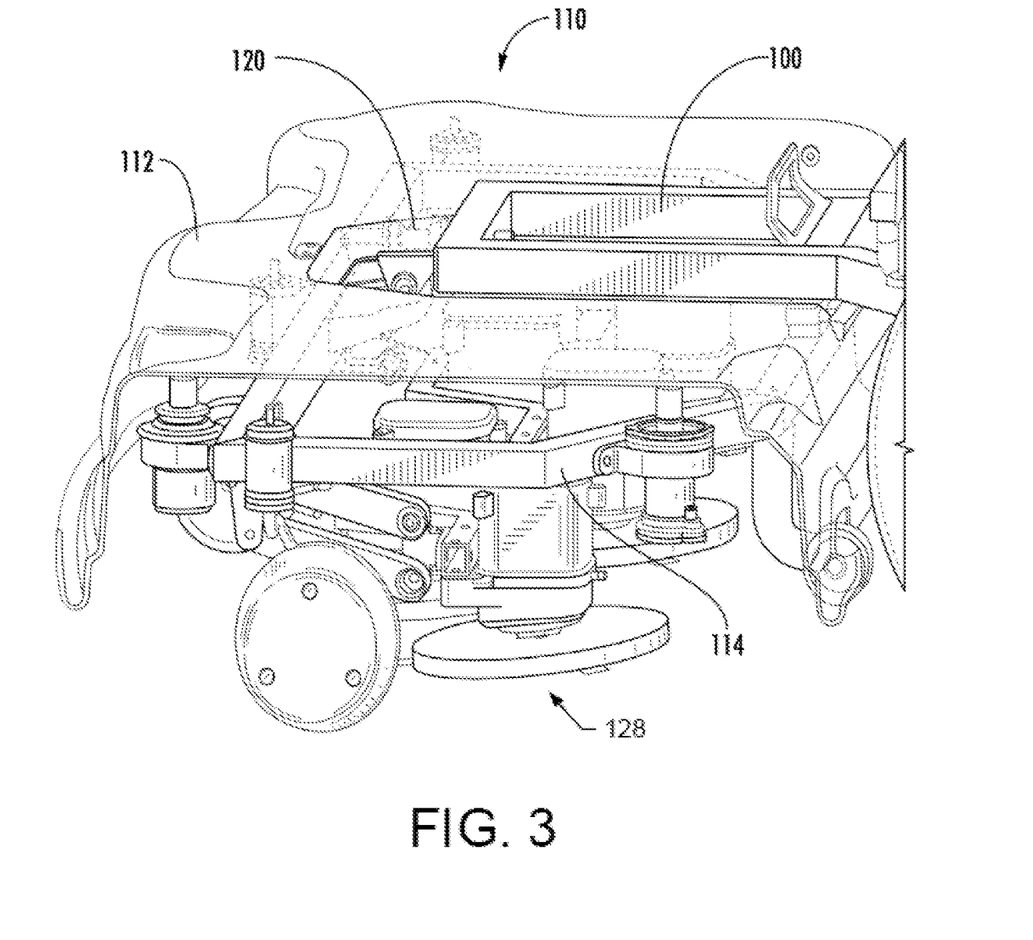
FIG. 3 illustrates a perspective view of some components of a cutting deck that is one example of a working module according to an example embodiment.
Figure 4:
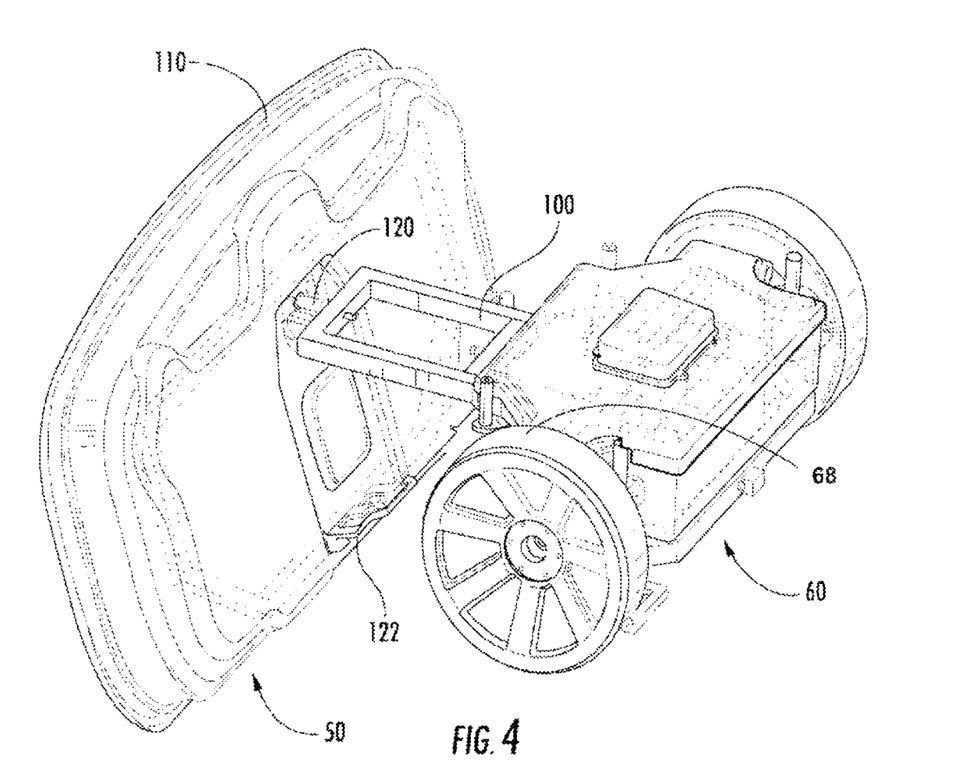
FIG. 4 illustrates a perspective view of the cutting deck tipped up for cleaning according to an example embodiment.

In order to enable the power module 60 to support connections to numerous different variations of the working module 50, the power module 60 may be provided with a structural member to which any of a number of different working accessories or attachments forming examples of the working module 50 may be attached. FIGS. 3 and 4 illustrate an example of such a structural member in the form of a universal frame support 100. The universal frame support 100 may extend from a front portion of the power module 60 to engage the working module 50, regardless of the specific embodiment of the working module 50 that is employed (e.g., a mower attachment, a snow thrower attachment, a watering attachment, etc.). In some embodiments, the universal frame support 100 may be an extension of the chassis or frame of the power module 60. However, it is possible for the universal frame support 100 to be a separate component that is attached to the frame or chassis of the power module 60.

FIG. 3 illustrates a perspective view of some components of a cutting deck 110 that is one example of the working module 50. FIG. 4 illustrates a perspective view of the cutting deck 110 tipped up for cleaning or service according to an example embodiment. As shown in FIGS. 3 and 4, the universal support frame 100 may be a substantially rectangular shaped structure extending forward of the power module 60. The universal support frame 100 may be formed of metallic or rigid plastic or composite materials formed into bars, rods or other rigid structures adapted to supporting a load. The universal support frame 100 may extend substantially parallel to the ground or other surface over which the power unit 60 transits. In this example, the universal support frame 100 may extend over at least a portion of the working module 50 such that the working module 50 may be attached to the universal support frame 100 at a top portion of the working module 50.

In the example of FIGS. 3 and 4, in which the working module 50 is embodied as the cutting deck 110, the cutting deck 110 may be provided with a cover 112 and a main frame 114. The cover 112 may enclose cutting components and the structures to which the cutting components mount. Thus, for example, the cover 112 may enclose the frame 114. However, in some embodiments, the frame 114 may be integrally formed into the cover 112. The frame 114 may support components of the cutting deck 110 and, in some embodiments, the frame 114 may support sensors including, for example, collision and/or lift sensors.

In an example embodiment, a front end of the universal support frame 100 may include an attachment joint 120 that is rotatably attachable to the cutting deck 110. In some cases, the attachment joint 120 may be connected to the cover 112. However, in some embodiments, the attachment joint 120 may be operably coupled to the frame 114 via an opening formed in the cover 112. The point of attachment between the attachment joint 120 and the cutting deck 110 may be proximate to a front portion of the cover 112. In some cases, the attachment joint 120 may be the only point at which the universal support frame 100 is coupled to the cover 112 or the frame 114. However, in some embodiments, a back portion of the cover 112 or frame 114 may include a releasable coupling 122 that may engage a portion of the universal support frame 100. The operator may be enabled to release the releasable coupling 122 and pivot the cutting deck 110 about the attachment joint 120 in order to expose the underside of the cutting deck 110 without the use of tools. The cutting deck 110 may then be cleaned or serviced relatively easily and without requiring the entire robotic vehicle 10 to be tipped over or on its side (or requiring tools or complex mechanical manipulation).

Figure 5:
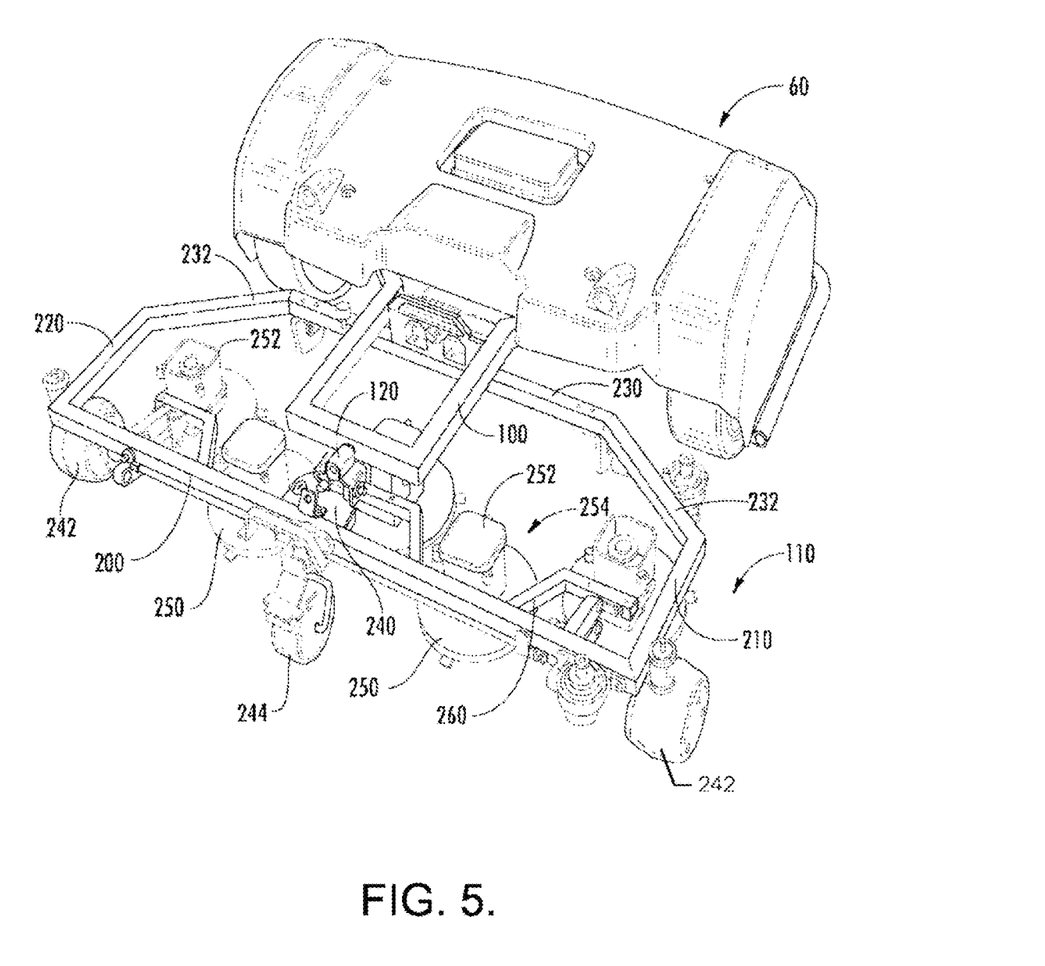
FIG. 5 illustrates a perspective view of the cutting deck with the cover removed to expose some of the components of the cutting deck according to an example embodiment.
Figure 6:
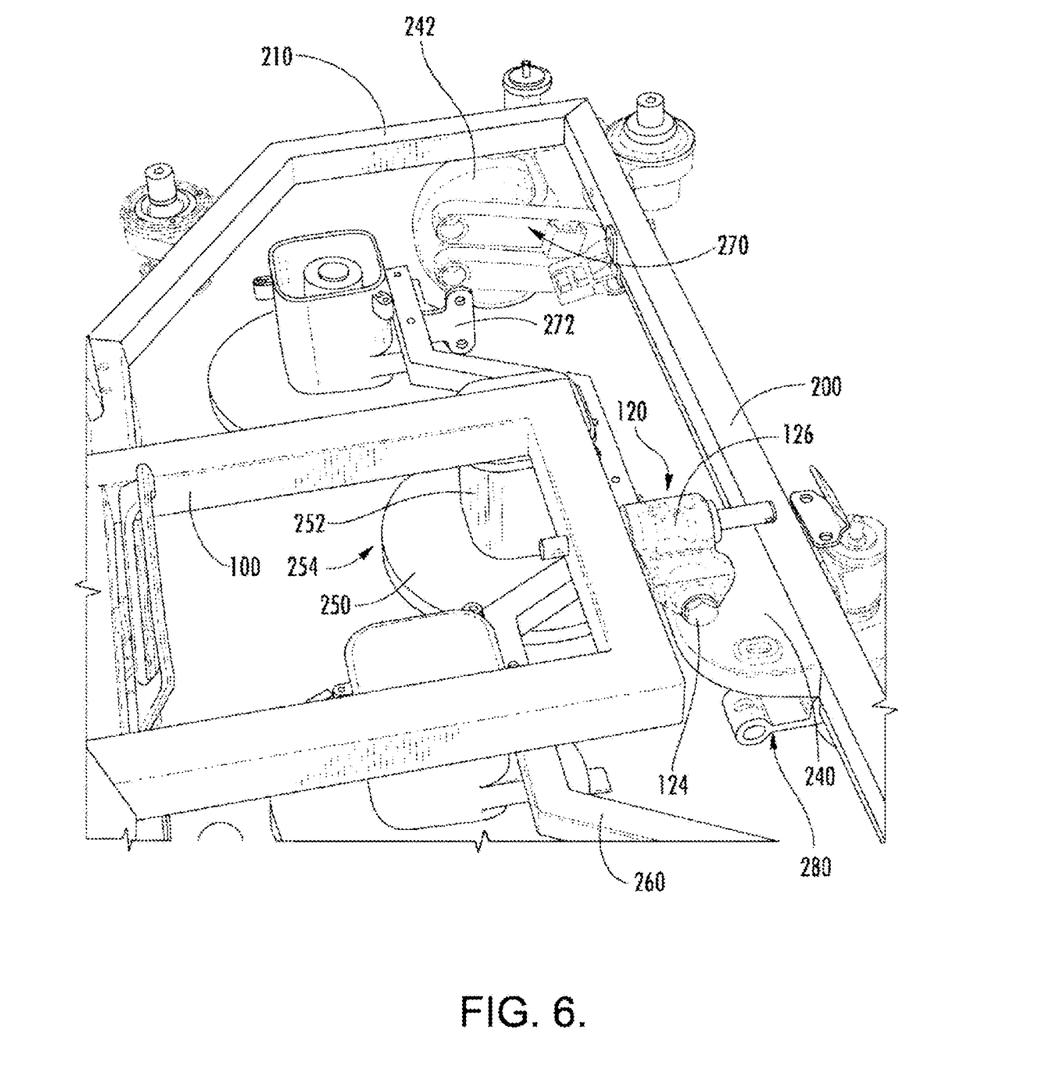
FIG. 6 illustrates a perspective view of a portion of the cutting deck to illustrate how height adjustments may be made according to one example embodiment.

FIGS. 5 and 6 show some of the components of the cutting deck 110 of an example embodiment in greater detail. In this regard, FIG. 5 illustrates a perspective view of the cutting deck 110 with the cover 112 removed to expose some of the components of the cutting deck. FIG. 6 illustrates a perspective view of a portion of the cutting deck 110 (again with cover 112 removed) to illustrate how height adjustments may be made according to one example embodiment.

In some embodiments, the frame 114 may be formed of metallic or rigid plastic or composite materials formed into bars, rods or other rigid structures adapted to supporting the cover 112 and cutting components of the cutting deck 110. In an example embodiment, as shown in FIGS. 5 and 6, the frame 114 may include a front member 200 that extends substantially transversely across the front of the cutting deck 110 along a straight line from one side of the cutting deck 110 to the other. The front member 200 may be joined to a first side member 210 that extends substantially perpendicularly rearward from one end of the front member 200 and a second side member 220 that mirrors the first side member to extend rearward from the other end of the front member 200. In some cases, the distal ends of the first and second side members 210 and 220 may be joined together by a rear member 230 that may extend substantially straight between the first and second side members 210 and 220. Although the rear member 230 may be straight in some cases, the rear member 230 of FIG. 5 includes angled portions 232 that extend rearward from the distal ends of the first and second side members 210 and 220.

In an example embodiment, the attachment joint 120 may be affixed to a bar extension 240 that may extend rearward from a middle portion of the front member 200. The front member 200 may also have a plurality of ground contacting wheels associated therewith. In this regard, for example, the front member 200 may provide support for a pair of outer wheels 242 and a center wheel 244. The outer wheels 242 may alternatively be supported by respective ones of the first and second side members 210 and 220, as shown in FIG. 5. As such, the outer wheels 242 may be supported outside the interior region defined by the frame 114. Likewise, the center wheel 244 may be supported outside the interior region defined by the frame 114 from approximately a center portion of the front member 200. In one example embodiment, as shown in FIG. 5, the center wheel 244 may be supported from the opposite side of the front member 200 to the side on which the bar extension 240 is supported. Furthermore, in order to prevent the center wheel 244 from pressing grass down before it can be cut, some embodiments may provide the center wheel 244 at a different height than the two outer wheels 242 (i.e., at a higher elevation such as about 15 mm higher in one case). As such, for example, when operating on flat ground, the center wheel 244 may not contact the ground while the outer wheels 242 are contacting the ground. However, when one of the outer wheels 242 encounters a hole or other depression, rather than the cutting deck 110 dropping on one side such that the grass beneath can be scalped by cutting blades/discs of the cutting deck 110, the center wheel 244 may begin contacting the ground and hold the cutting deck 110 up so that the grass is not scalped. Thus, the center wheel 244 may be useful for dealing with obstacles that may otherwise cause the cutting deck 110 to hang up.

In an example embodiment, a plurality of cutting discs 250 (or other operational tools) may be provided such that each cutting disc 250 is associated with a corresponding cutting motor 252 to form a plurality of cutters 254. The cutting motors 252 may receive power from the battery pack 64 of the power module 60. Each of the cutters 254 may be supported from a single cutter support beam 260. The cutter support beam 260 may be a single unitary bar from which the cutters 254 are suspended. However, it should be appreciated that the cutter support beam 260 could alternatively be made of multiple pieces in some embodiments. Each of the cutters 254 may be suspended from the cutter support beam 260 at the same height. Thus, at least when passing over flat ground, the cutting discs 250 may each cut to relatively the same height. However, in some embodiments, the heights of each of the cutters 254 may be adjustable. Thus, for example, the operator may be enabled to tip the cutting deck 110 as shown in FIG. 4, and then adjust the heights of one or more of the cutters 254 relative to the cutter support beam 260.

In order to ensure that there is overlap of the parallel cutting swaths defined by each of the cutting discs 250 (and therefore an even looking cut) as the robotic vehicle 10 moves over the ground, it may be advantageous to offset the cutters 254 along the direction of motion of the robotic vehicle 10 as one moves from one side of the cutting deck 110 to the other. Accordingly, the cutters 254 may be placed closer to each other as they extend transversely across the cutting deck 110 from one side to the other. The parallel swaths may therefore overlap without causing the cutting discs 250 to strike each other.

One way of providing the offset of the cutters 254 may be to mount the cutters to opposite sides of the cutter support beam 260 when the cutter support beam 260 is embodied as a straight bar. However, in some alternative embodiments, the cutters 254 may each be affixed to the same side of the cutter support beam 260 (e.g., the rear side, as shown in FIG. 5), but the cutter support beam 260 may be formed to have a zig zag shape as it extends transversely from one side of the cutting deck 110 to the other. For example, as shown in FIG. 5, the cutter support beam 260 may include parallel portions that extend substantially parallel to the front member 200 and the rear member 230 of the frame 114. The parallel portions may be joined together by angled portions that extend between each consecutive parallel portion. Each parallel portion may have one of the cutters 254 mounted thereto. Meanwhile, every other parallel portion may lie in a same plane, while consecutive parallel portions are in different planes. Accordingly, since all of the cutters 254 are mounted on the same side of the cutter support beam 260, the cutters 254 may all be relatively interchangeable.

In an example embodiment, the cutter support beam 260 may be supported at each of its respective ends by a parallelogram 270. The parallelograms 270 may extend rearward from the front member 200 such that the cutter support beam 260 and all of the cutters 254 fit within the footprint of the region defined by the frame 114. The parallelograms 270 may extend substantially parallel to the first and second side members 210 and 220 and therefore also substantially perpendicular to the front member 200. The parallelograms 270 may be spaced apart from each other by a distance that is substantially the same as the length of the cutter support beam 260 so that the cutter support beam 260 may be supported proximate to its ends by the parallelograms 270. In an example embodiment, the parallelograms 270 may extend from the front member 200 to define an angle relative to a plane in which the frame 114 lies. The magnitude of the angle may define the height of the cutting discs 250. As such, the parallelograms 270 may function to support the cutters 254 (e.g., the cutting motors 252 and the cutting discs 250) via support of the cutter support beam 260 and may also function to absorb or otherwise dampen mechanical shocks.

In an example embodiment, the cutter support beam 260 may not be directly mounted to the parallelograms 270. Instead, the cutter support beam 260 may have a shelf 272 disposed proximate to each end thereof and each shelf 272 may connect to the parallelogram 270. Each shelf 272 may be a bracket that is affixed to the cutter support beam 260 at or proximate to an end thereof to provide an adaptable attachment to the parallelogram 270 on its respective side of the cutting deck 110. In some embodiments, each shelf 272 may be configured to allow a relatively small amount of upward movement of the cutter support beam 260 so that, for example, the cutter support beam 260 may move upward in response to running into an obstacle in order to protect the cutting disc 250.

In an example embodiment, the connection of each shelf 272 to its respective parallelogram 270 may further enable a height of the cutters 254 to be adjusted via a single operator. In this regard, for example, the angle formed between the parallelograms 270 and the plane of the frame 114 may be adjustable. Alternatively, a height of each shelf 272 may be adjustable. In this regard, for example, each shelf 272 may be mounted on a separate axle. By turning the axle, e.g., via a single height adjuster 280, the height of the cutter support beam 260 may be adjusted. The height adjuster 280 may be positioned proximate to (or below) the bar extension 240 and/or the middle of the front member 200. The height adjuster 280 may be operably coupled to the axle of each shelf 272 via connecting linkages (not shown). In an example embodiment, each shelf 272 may be configured to provide firm support for the frame 114, but allow at least some motion in an upward direction to be accommodated so that upward motion is allowable to support tolerance for bumps, collisions or rough terrain.

In some embodiments, the height adjuster 280 may be manually operable by the operator. For example, a manual operator may be operably coupled to the height adjuster 280 and may protrude through the cover 112. Alternatively, the operator may interact with the height adjuster 280 when the cutting deck 110 is tipped as shown in FIG. 4. As yet another alternative, the height adjuster 280 may be operably coupled to a height adjustment motor that may be disposed either in the working module 50 or in the power module 60 and the height adjustment motor may be operated to adjust the cutting height of the robotic vehicle 10. The operation of the height adjustment motor may be conducted via the user interface 72, responsive to remote or local programming, or via any other suitable mechanism.

In some embodiments, the construction of the frame 114 and the attachments of the frame 114 to the universal support frame 100 and the cutter support beam 260 may be arranged to allow the cutting deck 110 to have multiple degrees of freedom of motion in order to give the cutting deck 110 good ground tracking without requiring a large number of vulnerable joints or complicated structures. In this regard, in some embodiments, the cutting deck 110 may have multi-axis directional freedom by virtue of having motion at least partially controllable in multiple directions. For example, the X-axis may be defined as the axis of the wheels 68. Thus, X-direction motion may be controlled by the wheels 68 themselves in combination with a number of sensors (e.g., lift and collision sensors). The Y-axis may be the vertical axis (i.e., an axis that is substantially perpendicular to the ground plane. Motion around the Y-axis may be at least partially accounted for by virtue of the vertical motion of the cutters 254 that is accommodated by the parallelograms 270. The Z-axis may be an axis that extends parallel to the ground plan and in the direction of forward motion of the robotic vehicle. Motion around the Z-axis may be permitted at least in part by the attachment joint 120. In this regard, for example, as shown in FIG. 6, the attachment joint 120 may include two rotational axes provided by a deck tilt joint 124 that enables the cutting deck to be tilted (e.g., for cleaning or maintenance) as shown in FIG. 4, and a Z-flex joint 126 that may enable movement about the Z-axis when rough terrain is encountered. Thus, for example, the Z-flex joint 126 and the deck tilt joint 124 may be hinged about axes that are substantially perpendicular to each other.

The frame 114 may therefore be structured to provide relatively good ground coverage, while avoiding scalping of grass or hanging up on bumps or other discontinuities in the ground being driven over. The wheels attached to the frame and the multi-axis motion permitted by construction of the frame 114 may therefore enable the robotic mower 10 to provide a flexible, yet consistent cutting experience while protecting the cutting discs 250, In some embodiments, each cutting disc 250 may further be provided with a puck 128 or some other protective feature below each cutting disc 250. The inclusion of the Z-flex joint 126 (providing flexible rotation about the Z-axis) in combination with the parallelograms 270 (supporting the cutter support beam 260 at each end thereof) to provide both Y motion and Z-flex, and in combination with the unique aspects of the cutting deck assembly (e.g., the protective features and wheel position) allows for a very close ground following feature without scalping the ground.

It should be appreciated that although the frame 114 described herein was specifically mentioned as a frame for a cutting deck, it is also possible to implement many of the structural features of the frame 114 in connection with other working modules that may be employed on the robotic vehicle 10. Thus, the concepts and structures described in association with the frame 114 herein should not be limited to application with working modules that are mowers or include cutting blades.

The control circuitry 12 of an example embodiment may include processing circuitry that may include one or more processors and one or more memory devices that store information for execution by the one or more processors and/or information gathered by sensors of the robotic vehicle 10. The control circuitry 12 may utilize the processing circuitry to communicate with internal and external devices to control operation of the robotic vehicle 10 and/or report information regarding the operation of the robotic vehicle 10 to external devices or networks. As such, the control circuitry 12 may include a device interface for enabling communication with devices and/or sensors (e.g., via a communication bus) and a user interface (e.g., user interface 72) for enabling communication with the operator.

In an example embodiment, a robotic vehicle is provided. The robotic vehicle may include a power module and a working module. The power module may include a battery pack (or other power source such as an engine), control circuitry configured to execute stored instructions to direct autonomous or self-guided (e.g., without direct and contemporaneous operator interaction) operation of the robotic vehicle on a defined area, and a drive motor for propelling the robotic vehicle responsive to control by the control circuitry. The working module may be configured to perform a function with respect to the defined area responsive to being propelled by the power module. The working module may be one of a plurality of interchangeable working modules that are attachable to the power module. At least one of the interchangeable working modules may have a different function than the working module.

In some cases, the features discussed above may be modified or augmented, or additional features may be added. Such modifications, augmentations or additions may be made alone or in any combination with each other. For example, in some cases, the interchangeable working modules may each be interchangeably and separately attachable to the power module without the use of tools. Alternatively or additionally, the working modules may include a cutting deck, a snow throwing attachment, a brush cutting attachment, a sweeping attachment, or a watering attachment. Alternatively or additionally, at least one of the interchangeable working modules may perform the same function as the working module, but may be configured to have a different size than the working module. Alternatively or additionally, the power module may further include one or more sensors of a sensor network. In such an example, the one or more sensors may be configured to detect objects encountered during operation of the robotic vehicle to determine a location of the robotic vehicle based on the objects detected, to determine a location of the vehicle relative to boundaries of the defined area or a point of interest associated with the defined area, and/or to detect collision, lifting, or tipping of the robotic vehicle. In some cases, each of the one or more sensors of the sensor network may be in communication with the control circuitry via a single communication bus that extends between the power module and the working module. In addition or as an alternative to the features above, the power module may include a universal frame support extending from a front portion of the power module to engage the working module. The universal frame support may extend substantially parallel to a surface over which the power unit transits and extends over at least a portion of the working module and/or may include an attachment joint that is rotatably attachable to the working module. The attachment joint may be disposed at a distal end of the universal support frame, and a releasable coupling may engage another portion of the universal support frame to the working module during operation of the working module. In some cases, the releasable coupling may be released to enable the working module to be pivoted about the attachment joint. The attachment joint may be configured to enable pivoting of the working module about an axis that extends in a transverse direction, and the attachment joint may further include a flexible joint configured to enable pivoting of the working module about an axis that extends substantially perpendicular to the transverse direction. In some cases, the working module may include a cutting deck including a frame that is operably coupled to a cutter support beam supporting a plurality of cutting discs. In an example embodiment, the cutter support beam extends transversely across the cutting deck and the cutting discs are mounted to opposite sides of the cutter support beam. In some cases, the cutter support beam extends transversely across the cutting deck and the cutting discs are mounted to the same side of the cutter support beam. In an example embodiment, the cutter support beam extends transversely across the cutting deck and is operably coupled to the frame by a parallelogram disposed at each opposing end of the cutter support beam. In some embodiments, an angle between the parallelogram and the frame is adjustable to adjust a height of the cutter support beam. In some cases, the parallelogram may be operably coupled to the frame via a bracket and the parallelogram is attachable to different vertically oriented points of the bracket to adjust a height of the cutter support beam. In an example embodiment, the cutting deck includes outer wheels disposed proximate to opposing transverse ends thereof, and the cutting disc further includes at least one protective feature configured to inhibit the cutting discs from engaging the ground. In some cases, the at least one protective feature may include a puck disposed at a bottom portion of at least one of the cutting discs. In an example embodiment, the at least one protective feature may include an interior wheel disposed between the outer wheels, the interior wheel may be configured to be spaced apart from a plane in which ground engaging portions of the outer wheels are disposed.

In another example embodiment, a robotic vehicle is provided that may include a power module and a working module. The power module may include a battery pack, control circuitry configured to execute stored instructions to direct autonomous or self-guided operation of the robotic vehicle on a defined area, and a drive motor for propelling the robotic vehicle responsive to control by the control circuitry. The working module may have a frame and be configured to perform a function with respect to the defined area responsive to being propelled by the power module.

The power module may include a universal frame support extending from a front portion of the power module to rotatably engage a portion of the frame of the working module.

In some cases, the features discussed above may be modified or augmented, or additional features may be added. Such modifications, augmentations or additions may be made alone or in any combination with each other. For example, in some cases, the universal frame support may extend substantially parallel to a surface over which the power unit transits and extends over at least a portion of the working module to engage the frame. Alternatively or additionally, the universal support frame may include an attachment joint that is rotatably attachable to the working module. In some cases, the attachment joint may be disposed at a distal end of the universal support frame, and a releasable coupling may engage another portion of the universal support frame to the working module during operation of the working module. In some embodiments, the releasable coupling may be released to enable the working module to be pivoted about the attachment joint. In an example embodiment, the attachment joint may be configured to enable pivoting of the working module about an axis that extends in a transverse direction across the working module, and the attachment joint may further include a flexible joint configured to enable pivoting of the working module about an axis that extends substantially perpendicular to the transverse direction.

In yet another example embodiment, a robotic vehicle is provided that may include a power module and a cutting deck. The power module may include a battery pack, control circuitry configured to execute stored instructions to direct autonomous or self-guided operation of the robotic vehicle on a defined area, and a drive motor for propelling the robotic vehicle responsive to control by the control circuitry. The cutting deck may include a frame that is operably coupled to a cutter support beam supporting a plurality of cutting discs configured to perform a cutting function with respect to the defined area responsive to being propelled by the power module. The cutting deck may be releasably and pivotally attached to a forward portion of the power module.

In some cases, the features discussed above may be modified or augmented, or additional features may be added. Such modifications, augmentations or additions may be made alone or in any combination with each other. For example, in some cases, the power module may include a universal frame support extending from a front portion of the power module to engage a portion of the frame of the cutting deck. In some cases, the cutter support beam extends transversely across the cutting deck and the cutting discs are mounted to opposite sides of the cutter support beam. In an example embodiment, the cutter support beam may be substantially straight while extending transversely across the cutting deck. In some embodiments, the cutter support beam extends transversely across the cutting deck and the cutting discs are mounted to the same side of the cutter support beam. In an example embodiment, the cutter support beam extends transversely across the cutting deck in a zigzag pattern. Additionally or alternatively, the cutter support beam may extend transversely across the cutting deck and is operably coupled to the frame by a parallelogram disposed at each opposing end of the cutter support beam. In some cases, an angle between the parallelogram and the frame may be adjustable to adjust a height of the cutter support beam. In some embodiments, the parallelogram is operably coupled to the frame via a bracket and the parallelogram is attachable to different vertically oriented points of the bracket to adjust a height of the cutter support beam. In an example embodiment, the cutting deck may include outer wheels disposed proximate to opposing transverse ends thereof, and the cutting disc may further include at least one protective feature configured to inhibit the cutting discs from engaging the ground. In some cases, the at least one protective feature may be a puck disposed at a bottom portion of at least one of the cutting discs. Alternatively or additionally, the at least one protective feature may be an interior wheel disposed between the outer wheels where the interior wheel is configured to be spaced apart from a plane in which ground engaging portions of the outer wheels are disposed.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A robotic vehicle comprising:
a power module including:
a power source;
control circuitry configured to execute stored instructions to direct operation of the robotic vehicle on a defined area;
at least one drive wheel; and
a drive motor for propelling the robotic vehicle, via the at least one drive wheel, responsive to control by the control circuitry; and
a working module comprising:
a cutting deck including a frame that is operably coupled to a cutter support beam supporting a plurality of cutting discs, the plurality of cutting discs being powered by the power source of the power module; and
at least one ground contacting support wheel operable coupled to the support beam;
wherein the power module includes a universal support frame extending from a portion of the power module to engage the working module, the universal support frame including an attachment joint that is rotatably attached to the working module, and
wherein the cutting deck is one of a plurality of interchangeable working modules that are attachable to the power module, wherein at least one of the interchangeable working modules has a different function than the cutting deck.

2. The robotic vehicle of claim 1, wherein the interchangeable working modules are each interchangeably and separately attachable to the power module without the use of additional tools.

3. The robotic vehicle of claim 1, wherein the power module further includes one or more sensors of a sensor network configured to detect objects encountered during operation of the robotic vehicle to determine a location of the robotic vehicle based on the objects detected.

4. The robotic vehicle of claim 3, wherein the one or more sensors are configured to determine a location of the vehicle relative to boundaries of the defined area or a point of interest associated with the defined area.

5. The robotic vehicle of claim 3, wherein the one or more sensors are configured to detect collision, lifting, or tipping of the robotic vehicle.

6. The robotic vehicle of claim 3, wherein each of the one or more sensors of the sensor network is in communication with the control circuitry via a single communication bus that extends between the power module and the working module.

7. The robotic vehicle of claim 1, wherein the attachment joint is disposed at a distal end of the universal support frame, and wherein a releasable coupling is configured to engage another portion of the universal support frame to the working module.

8. The robotic vehicle of claim 7, wherein the releasable coupling is released to enable the working module to be pivoted about the attachment joint.

9. A robotic vehicle comprising:
a power module including:
a power source;
control circuitry configured to execute stored instructions to direct operation of the robotic vehicle on a defined area;
at least one drive wheel; and
a drive motor for propelling the robotic vehicle, via the at least one drive wheel, responsive to control by the control circuitry;
a working module comprising:
a cutting deck including a frame that is operably coupled to a cutter support beam supporting a plurality of cutting discs, the plurality of cutting discs being powered by the power source of the power module; and
at least one ground contacting support wheel operably coupled to the support beam; and
a universal support frame extending from a portion of one of the power module or the working module to engage the other of the working module or power module, the universal support frame including an attachment joint that is rotatably attached to the working module, and
wherein the cutting deck is one of a plurality of interchangeable working modules that are attachable to the power module, wherein at least one of the interchangeable working modules has a different function than the cutting deck.

10. A robotic vehicle comprising:
a power module including:
a power source;
at least one drive wheel;
control circuitry configured to execute stored instructions to direct operation of the robotic vehicle on a defined area; and
a drive motor for propelling the robotic vehicle responsive to control by the control circuitry;
a deck including a frame that is operably coupled to a support beam supporting a plurality of operational tools configured to perform a function with respect to the defined area responsive to being propelled by the power module, and
a universal support frame extending from a portion of one of the power module or the deck to engage the other of the deck or power module, the universal support frame including an attachment joint that is rotatably attached to the deck, and
wherein the deck is releasably and pivotally attached to a forward portion of the power module.

11. The robotic vehicle of claim 10, wherein the support beam extends transversely across the deck and the operational tools are mounted to opposite sides of the support beam.

12. The robotic vehicle of claim 11, wherein the support beam is substantially straight while extending transversely across the deck.

13. The robotic vehicle of claim 10, wherein the support beam extends transversely across the deck and the operational tools are mounted to the same side of the support beam.

14. The robotic vehicle of claim 13, wherein the support beam extends transversely across the deck in a zigzag pattern.

15. The robotic vehicle of claim 10, wherein the support beam extends transversely across the deck and is operably coupled to the frame by a parallelogram disposed at each opposing end of the support beam.

16. The robotic vehicle of claim 15, wherein an angle between the parallelogram and the frame is adjustable to adjust a height of the support beam.

17. The robotic vehicle of claim 15, wherein the parallelogram is operably coupled to the frame via a bracket and the parallelogram is attachable to different vertically oriented points of the bracket to adjust a height of the support beam.

18. The robotic vehicle of claim 10, wherein the deck includes outer wheels disposed proximate to opposing transverse ends thereof, and wherein the cutting disc further includes at least one protective feature configured to inhibit the cutting discs from engaging the ground.

19. The robotic vehicle of claim 18, wherein the at least one protective feature comprises a puck disposed at a bottom portion of at least one of the operational tools.

20. The robotic vehicle of claim 18, wherein the at least one protective feature comprises an interior wheel disposed between the outer wheels, the interior wheel being configured to be spaced apart from a plane in which ground engaging portions of the outer wheels are disposed.

* * * * *